United States Patent
Sadasivam et al.

(10) Patent No.: US 9,129,057 B2
(45) Date of Patent: Sep. 8, 2015

(54) SMART MULTIPLEXING OF PERFORMANCE COUNTERS FOR PERFORMANCE MEASUREMENT

(75) Inventors: Satish K. Sadasivam, Tamilnadu (IN); Prathiba Kumar, Tamilnadu (IN); Rajan Ravindran, Karnataka (IN); Sangram Alapati, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 13/461,059

(22) Filed: May 1, 2012

(65) Prior Publication Data
US 2013/0297258 A1 Nov. 7, 2013

(51) Int. Cl.
*G06F 15/00* (2006.01)
*G01C 17/00* (2006.01)
*G06F 11/34* (2006.01)

(52) U.S. Cl.
CPC ........ *G06F 11/3466* (2013.01); *G06F 2201/81* (2013.01); *G06F 2201/86* (2013.01); *G06F 2201/865* (2013.01); *G06F 2201/88* (2013.01)

(58) Field of Classification Search
CPC . G06F 2201/86; G06F 2201/88; G06F 11/26; G06F 11/3409; G06F 11/3428; G06F 11/3466; G06F 11/348; G06F 2201/81; G06F 2201/865
USPC ........ 702/119, 176–178, 182, 183, 186, 187; 711/165; 717/124, 127, 128, 130, 131; 719/318; 712/227; 377/39
See application file for complete search history.

(56) References Cited

U.S. PATENT DOCUMENTS

| | | | |
|---|---|---|---|
| 5,164,969 A * | 11/1992 | Alley et al. | 377/39 |
| 5,875,119 A | 2/1999 | Bauman et al. | |
| 6,564,175 B1 * | 5/2003 | Hady et al. | 702/186 |
| 7,225,309 B2 * | 5/2007 | DeWitt et al. | 711/165 |
| 7,877,759 B2 | 1/2011 | Gara et al. | |
| 7,958,342 B1 | 6/2011 | Lane et al. | |
| 2006/0277395 A1 | 12/2006 | Fowles | |

(Continued)

OTHER PUBLICATIONS

H. Servat et al., Detailed Performance Analysis Using Coarse Grain Sampling, Proceeding Euro-Par '09 Proceedings of the 2009 International Conference on Parallel Processing Springer-Verlag Berlin, Heidelberg, 2010.

(Continued)

*Primary Examiner* — John H Le
(74) *Attorney, Agent, or Firm* — Terrile, Cannatti, Chambers & Holland, LLP; Stephen A. Terrile

(57) ABSTRACT

The present disclosure includes, but is not limited to, a method, system and computer-usable medium for improving performance measurement by analyzing the various events in a multiplexing counting mode and configuring the sampling time accordingly to more effectively performing the sampling. In certain embodiments, when groups of operations are identified for sampling, the present disclosure generates a time sampling table for these groups of operations. The time sampling table is dynamically altered during the runtime of the application to alter the sampling interval of each group. The sampling interval of each group can be increased or decreased based on a threshold of occurrence of the event. This disclosure provides more accurate performance measurement of important events and facilitates a determination of how important events impact application performance.

18 Claims, 3 Drawing Sheets

(56) References Cited

U.S. PATENT DOCUMENTS

2007/0150871 A1    6/2007    Barsness et al.
2011/0145829 A1    6/2011    Molnar et al.
2011/0145838 A1    6/2011    de Melo et al.

OTHER PUBLICATIONS

W. Mathur, Improved Estimation for Software Multiplexing of Performance Counters, 13th IEEE International Symposium on Modeling, Analysis, and Simulation of Computer and Telecommunication Systems, Issue Date: Sep. 27-29, 2005.
W. Mathur, Improving Accuracy for Software Multiplexing of On-Chip Performance Counters, 2004 http://www.ece.nmsu.edu/~jecook/thesis/Wiplove_thesis.pdf.
T. Mytkowicz et al., Time Interpolation: So Many Metrics, So Few Registers, 40th Annual IEEE/ACM International Symposium on Microarchitecture, 2007. MICRO 2007, Issue Date: Dec. 1-5, 2007.
R. Azimi et al., Online Performance Analysis by Statistical Sampling of Microprocessor Performance Counters, Proceedings of the 19th annual international conference on Supercomputing, 2005.
W. Mathur, Improved Estimation for Software Multiplexing of Performance Counters, 13th IEEE International Symposium on Modeling, Analysis, and Simulation of Computer and Telecommunication Systems, Issue Date: Sep. 27-29, 2005 (Abstract).
H. Servat et al., Detailed Performance Analysis Using Coarse Grain Sampling, Proceeding Euro-Par '09 Proceedings of the 2009 International Conference on Parallel Processing Springer-Verlag Berlin, Heidelberg, 2010 (Abstract).

* cited by examiner

SMART MULTIPLEXING OF PERFORMANCE COUNTERS FOR PERFORMANCE MEASUREMENT

BACKGROUND

1. Field

The present disclosure relates in general to the field of computers and similar technologies, and in particular to software utilized in this field. Still more particularly, the present disclosure relates to automated management of threshold crossing alarms.

2. Description of the Related Art

Performance tools provide and important role in the analysis of performance applications such as customer applications. There is a plurality of known types of tools available for performance measurement at various levels. An example of a tool used by performance analysts is a performance counter measurement tool for various Event groups. Because the number of performance counters available in certain types of hardware is limited, only limited set of events can be configured to be analyzed for each run.

One solution to the limit is using multiplexing of the performance counters. With multiplexing, numerous events may be counted during a single run of a particular application by executing multiple groups of performance counters in a time sharing environment. However, known methods of multiplexing performance counters do not take into account which events are necessary or desirable to count. By not taking this information into account, it is possible that the multiplexing may configure and count various unwanted groups of events. These unwanted groups of events may not have any activity associated with them. Thus resulting in wastage of time in counting non-occurrence events and correspondingly not allocating enough time counting the more frequently occurring events.

SUMMARY

The present disclosure includes, but is not limited to, a method, system and computer-usable medium for improving performance measurement by analyzing the various events in a multiplexing counting mode and configuring the sampling time accordingly to more effectively performing the sampling. In certain embodiments, when groups of operations are identified for sampling, the present disclosure generates a time sampling table for these groups of operations. The time sampling table is dynamically altered during the runtime of the application to alter the sampling interval of each group. The sampling interval of each group can be increased or decreased based on a threshold of occurrence of the event. This disclosure provides more accurate performance measurement of important events and facilitates a determination of how important events impact application performance.

The above, as well as additional purposes, features, and advantages of the present disclosure will become apparent in the following detailed written description.

BRIEF DESCRIPTION OF THE DRAWINGS

Selected embodiments of the present disclosure may be understood, and its numerous objects, features and advantages obtained, when the following detailed description is considered in conjunction with the following drawings, in which.

DETAILED DESCRIPTION

Figure 1:
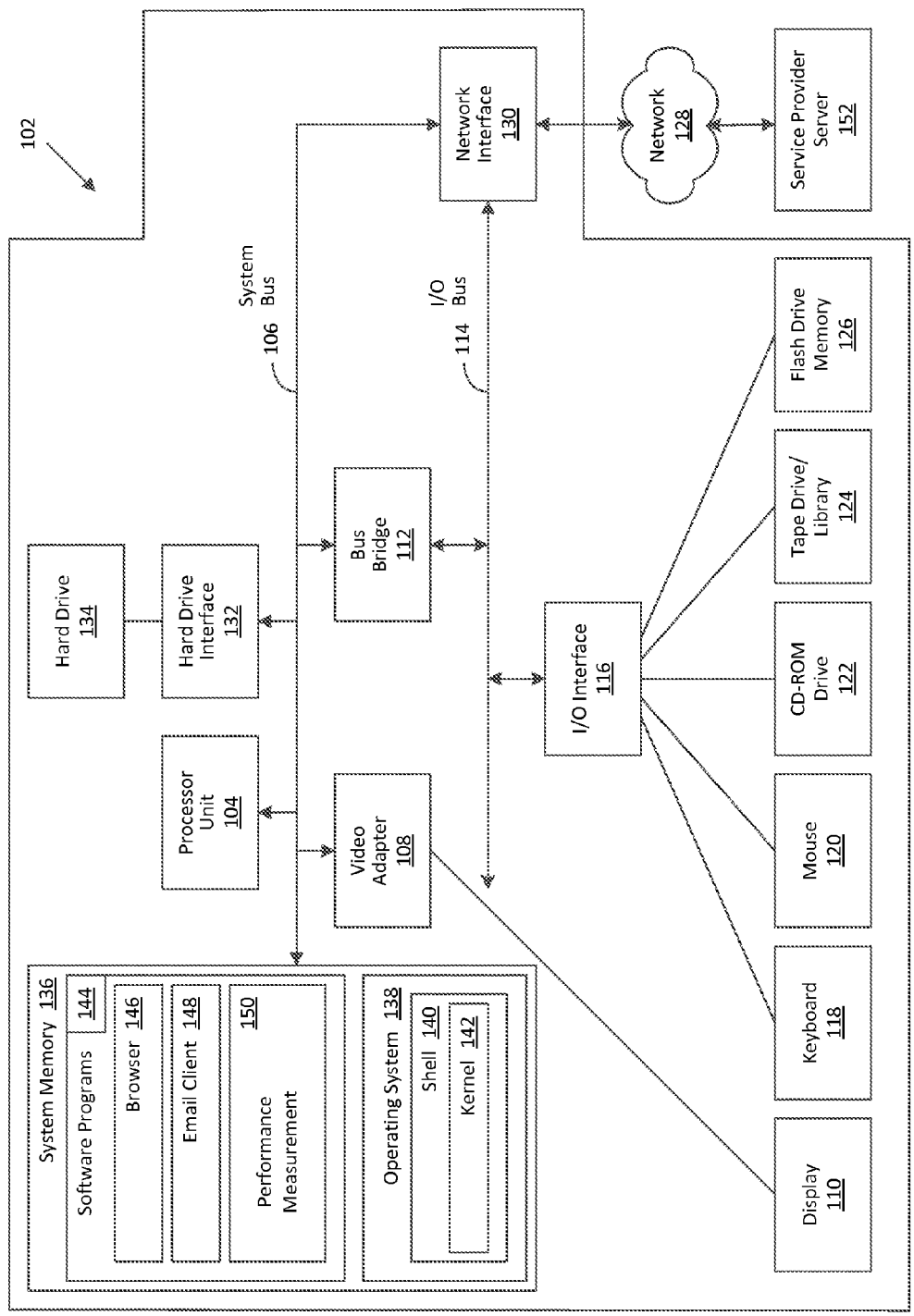
FIG. 1 depicts an exemplary client computer in which the present disclosure may be implemented.

A method, system and computer-usable medium are disclosed for providing improved performance measurement. As will be appreciated by one skilled in the art, the present disclosure may be embodied as a method, system, or computer program product. Accordingly, embodiments of the disclosure may be implemented entirely in hardware, entirely in software (including firmware, resident software, microcode, etc.) or in an embodiment combining software and hardware. These various embodiments may all generally be referred to herein as a "circuit," "module," or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, radio frequency (RF), etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present disclosure may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present disclosure to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present disclosure can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a performance measurement module 150. The performance measurement module 150 includes code for implementing the processes described in FIGS. 2 through 4 described hereinbelow. In one embodiment, client computer 102 is able to download performance measurement module 150 from a service provider server 152.

The performance measurement module 150 enables analyzing the various events in a multiplexing counting mode and configuring the sampling time accordingly to more effectively performing the sampling. In certain embodiments, when groups of operations are identified for sampling, the performance module 150 generates a time sampling table for these groups of operations. The time sampling table is dynamically altered during the runtime of the application to alter the sampling interval of each group. The sampling interval of each group can be increased or decreased based on a threshold of occurrence of the event. The performance measurement module 150 provides more accurate performance measurement of important events and facilitates a determination of how important events impact application performance.

The hardware elements depicted in client computer 102 are not intended to be exhaustive, but rather are representative to highlight components used by the present disclosure. For instance, client computer 102 may include alternate memory storage devices such as magnetic cassettes, Digital Versatile Disks (DVDs), Bernoulli cartridges, and the like. These and other variations are intended to be within the spirit and scope of the present disclosure.

Figure 2:
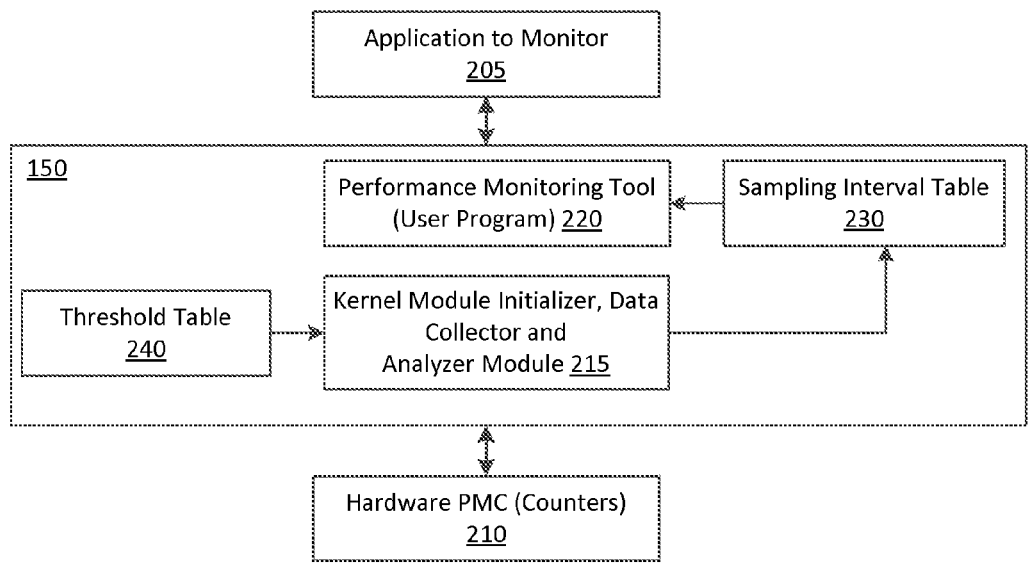
FIG. 2 shows a simplified block diagram of performance measurement system.

Referring to FIG. 2, a simplified block diagram of performance measurement framework 200 in which the performance module 150 operates is shown. The performance measurement framework 150 monitors an application 205 using performance measurement counters 210 as well as a performance kernel module 215. The performance measurement module 150 includes a performance monitoring tool 220, a sampling interval table 230 and a threshold table 240.

The kernel module 215 configures the various counters included within the performance measurement counters 210. The kernel module 215 also configures the sampling time for each group of events within the application 205 to be monitored.

The sample time interval table 230 and the threshold table 240 allow a user to specify their own sampling time for each of the group in terms of percentage and also absolute counts for each group which are then initialized in the table for the software to use, if the user is aware of the total execution time and how the program phases behave, this way user can control the counting of different groups at different phases of the program. In this mode the dynamic altering of sample time based on the analysis is not applicable since user himself has provided the weight age for each group. The kernel module 215 accumulates the counter values for each group.

Figure 3:
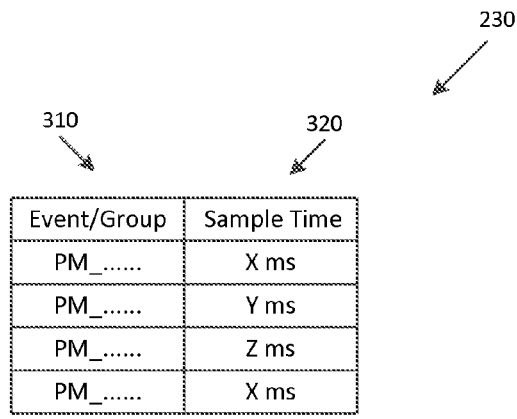
FIG. 3 shows an example of an interval table of the performance measurement system.

FIG. 3 shows an example of a sampling interval table 230 of the performance measurement framework. The sampling interval table 230 includes a plurality of event/group identifiers 310 as well as a corresponding plurality of sampling time entries 320. The sampling time entry for a respective event or group has a unique sampling time which may or may not be different from the sampling time of another event or group. For example event/group entries 1 and 4 have a sampling time of X ms where as event/group entry 2 has a sampling time of Y ms and event/group entry 3 has a sampling time of Z ms.

Figure 4:
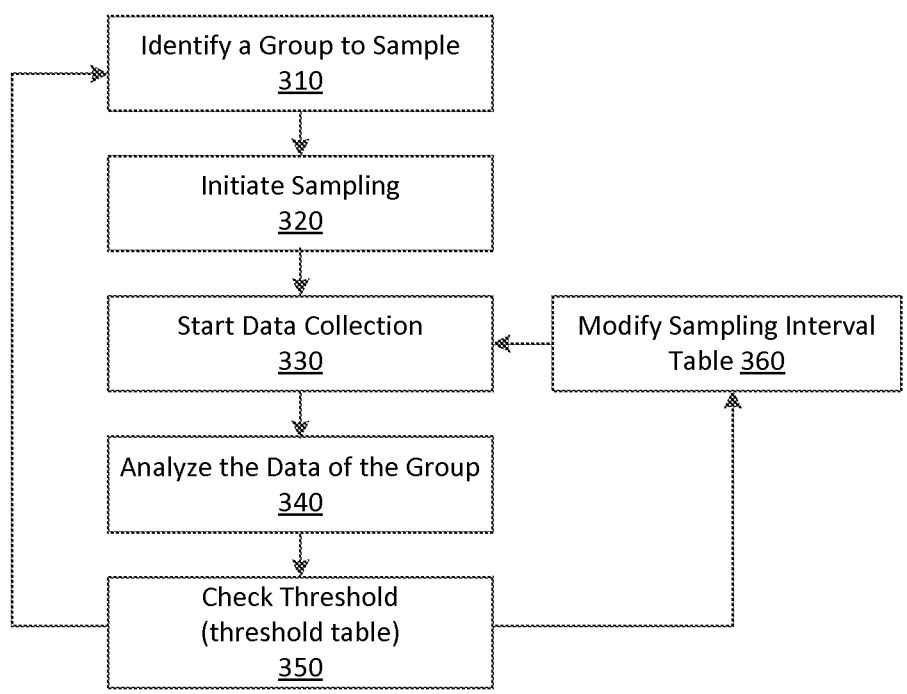
FIG. 4 shows a flowchart of the operation of the performance measurement system.

Referring to FIG. 4, a flowchart of the operation of the performance measurement framework 200 is shown. More specifically, in operation, a group or groups are identified for sampling at step 310. Next, the sampling interval table 230 is initiated with a default sample time for each of the groups to be sampled at step 320. After initializing the sampling interval table 230 with the default sample times, the performance monitoring counter activity analyzes the data of the group by performing data collection and accumulation of the counts of various events at step 330. During the course of execution of the application, the accumulated event count is measured against the total cycles and the total instructions completed at step 340. This operation provides an indication of a rate of occurrence of various events in the course of execution.

Next, at step 350 a sample time identifier portion of the performance monitoring tool 220 performs an analysis of a rate of occurrence of various events using the threshold table 250 which is available for each event. Based on the analysis, the sample time stored within the sampling interval table 230 of each group may be altered at step 360. For example, if the sample time identifier portion determines a rate of occurrence of a particular event (e.g., Group 1) is large (e.g., more than twice) compared to an event in a different group (e.g., Group 2) then the sample time associated with Group 1 is increased slightly and the sample time associated with Group 2 is decreased. Each and every time a particular group is configured for counting in the multiplexing mode the sample time is obtained from the dynamic sampling interval table and loaded in a register of the performance measurement counters 210.

It will be apparent to skilled practitioners of the art that many such combinations are possible to provide the processing of transactions and the foregoing is not intended to limit the spirit, scope, or intent of the disclosure.

Having thus described the disclosure of the present application in detail and by reference to preferred embodiments thereof, it will be apparent that modifications and variations are possible without departing from the scope of the disclosure defined in the appended claims.

What is claimed is:

1. A method for improving performance measurement comprising:
   monitoring an application using a hardware performance measurement counter, the monitoring the application comprising identifying a plurality of events while the application is executing;
   analyzing the plurality of events in a multiplexing counting mode, the multiplexing counting mode using a hardware performance measurement counter to perform the analyzing;
   configuring a sampling time to more effectively perform sampling, the configuring the sampling time comprising identifying a group of operations for sampling and generating an interval sample time for the group of operations for sampling based upon the analyzing; and,
   determining how the plurality of events impact performance of the application based upon the monitoring, analyzing and configuring.

2. The method of claim 1, further comprising:
generating a time sampling table for a plurality of groups of operations when a plurality of groups of operations are identified for sampling.

3. The method of claim 2, further comprising:
dynamically altering the time sampling table during runtime of the application to individually alter the sampling interval of each group.

4. The method of claim 3, wherein
the sampling interval of each group is independently modified based on a threshold of sampling count corresponding to the group of operations.

5. The method of claim 1, wherein
the threshold for each group is stored within a corresponding entry of a threshold table.

6. The method of claim 5, wherein
a sampling time for each group is specified as one of a percentage and an absolute count.

7. A system comprising:
a processor;
a data bus coupled to the processor; and
a computer-usable medium embodying computer program code, the computer-usable medium being coupled to the data bus, the computer program code comprising instructions executable by the processor and configured for:
   monitoring an application using a hardware performance measurement counter, the monitoring the application comprising identifying a plurality of events while the application is executing;
   analyzing the plurality of events in a multiplexing counting mode, the multiplexing counting mode using a hardware performance measurement counter to perform the analyzing;
   configuring a sampling time to more effectively perform sampling, the configuring the sampling time comprising identifying a group of operations for sampling and generating an interval sample time for the group of operations for sampling based upon the analyzing; and,
   determining how the plurality of events impact performance of the application based upon the monitoring, analyzing and configuring.

8. The system of claim 7, wherein the computer program code further comprises instructions executable by the processor and configured for:
generating a time sampling table for a plurality of groups of operations when a plurality of groups of operations are identified for sampling.

9. The system of claim 8, wherein the computer program code further comprises instructions executable by the processor and configured for:
dynamically altering the time sampling table during runtime of the application to individually alter the sampling interval of each group.

10. The system of claim 9, wherein
the sampling interval of each group is independently modified based on a threshold of sampling count corresponding to the group of operations.

11. The system of claim 7, wherein
the threshold for each group is stored within a corresponding entry of a threshold table.

12. The system of claim 11, wherein
a sampling time for each group is specified as one of a percentage and an absolute count.

13. A non-transitory computer-usable medium embodying computer program code, the computer program code comprising computer executable instructions configured for:
monitoring an application using a hardware performance measurement counter, the monitoring the application comprising identifying a plurality of events while the application is executing;
analyzing the plurality of events in a multiplexing counting mode, the multiplexing counting mode using a hardware performance measurement counter to perform the analyzing;
configuring a sampling time to more effectively perform sampling, the configuring the sampling time comprising identifying a group of operations for sampling and generating an interval sample time for the group of operations for sampling based upon the analyzing; and,
determining how the plurality of events impact performance of the application based upon the monitoring, analyzing and configuring.

14. The computer-usable medium of claim 13, wherein the computer program code further comprises instructions executable by the processor and configured for:
generating a time sampling table for a plurality of groups of operations when a plurality of groups of operations are identified for sampling.

15. The computer-usable medium of claim 14, wherein the computer program code further comprises instructions executable by the processor and configured for:
dynamically altering the time sampling table during runtime of the application to individually alter the sampling interval of each group.

16. The computer-usable medium of claim 15, wherein
the sampling interval of each group is independently modified based on a threshold of sampling count corresponding to the group of operations.

17. The computer-usable medium of claim 13, wherein
the threshold for each group is stored within a corresponding entry of a threshold table.

18. The computer-usable medium of claim 17, wherein
a sampling time for each group is specified as one of a percentage and an absolute count.

* * * * *